(12) United States Patent
Kim et al.

(10) Patent No.: US 8,570,581 B2
(45) Date of Patent: Oct. 29, 2013

(54) IMAGE FORMING METHOD AND SYSTEM USING XHTML-PRINT DATA

(75) Inventors: Dae-hyun Kim, Yongin-si (KR); Jun-hyung Ha, Seoul (KR); Sung-won Chae, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/462,224

(22) Filed: May 2, 2012

(65) Prior Publication Data

US 2012/0218585 A1 Aug. 30, 2012

Related U.S. Application Data

(62) Division of application No. 11/371,050, filed on Mar. 9, 2006, now Pat. No. 8,194,269.

(30) Foreign Application Priority Data

Apr. 11, 2002 (KR) ................................. 2005-29951
Jun. 11, 2005 (KR) ................................. 2005-50139

(51) Int. Cl.
*G06F 3/12* (2006.01)
*G06F 15/00* (2006.01)
*G06F 17/00* (2006.01)
*G06F 3/00* (2006.01)
*H04N 1/00* (2006.01)

(52) U.S. Cl.
USPC ....... 358/1.15; 358/1.1; 358/1.6; 358/426.06; 358/435; 715/234; 715/239; 715/760

(58) Field of Classification Search
USPC .............. 358/1.15, 1.1, 1.16, 1.18, 435, 453, 358/471, 476, 425, 401, 540, 537, 508, 501, 358/426.06; 715/200, 206, 207, 215, 243, 715/274, 276, 700, 738, 764, 810, 966, 234, 715/760, 762; 455/41.2, 550.1, 419, 566, 455/557, 3.01, 3.05, 408, 414.3, 73, 91, 132
See application file for complete search history.

(56) References Cited

U.S. PATENT DOCUMENTS

| | | |
|---|---|---|
| 2004/0066529 A1* | 4/2004 | Wu et al. ....................... 358/1.15 |
| 2004/0176117 A1* | 9/2004 | Strittmatter et al. .......... 455/500 |
| 2004/0176118 A1* | 9/2004 | Strittmatter et al. .......... 455/500 |
| 2004/0252333 A1* | 12/2004 | Blume et al. .................. 358/1.15 |
| 2005/0114766 A1* | 5/2005 | Yamamoto ..................... 715/527 |

FOREIGN PATENT DOCUMENTS

| | | |
|---|---|---|
| JP | 2002-229752 | 8/2002 |
| JP | 2003-140858 | 5/2003 |
| JP | 2004-054311 | 2/2004 |

(Continued)

OTHER PUBLICATIONS

W3C, XHTML Print, Jan. 2004, W3C, all pages.*

(Continued)

*Primary Examiner* — Ngon Nguyen
(74) *Attorney, Agent, or Firm* — Stanzione & Kim, LLP

(57) ABSTRACT

An image forming method using extensible hypertext markup language (XHTML)-print data, including receiving registration information about an image forming apparatus from the image forming apparatus, generating XHTML-Print data from print data using the registration information of the information forming apparatus, transmitting the XHTML-Print data to the image forming apparatus, and printing the XHTML-Print data.

15 Claims, 11 Drawing Sheets

(56) References Cited

FOREIGN PATENT DOCUMENTS

| | | |
|---|---|---|
| JP | 2004-114326 | 4/2004 |
| JP | 2004-127262 | 4/2004 |
| JP | 2004-139460 | 5/2004 |
| JP | 2004-291494 | 10/2004 |
| KR | 2002-0020396 | 3/2002 |
| KR | 2003-94512 | 12/2003 |
| KR | 10-2004-0038459 | 5/2004 |
| KR | 10-2004-0050764 | 6/2004 |
| KR | 2004-111057 | 12/2004 |

OTHER PUBLICATIONS

Brown et al., XHTML—Basic Tags, Article Jul. 2004, Synergy Consulting, all pages.*

* cited by examiner

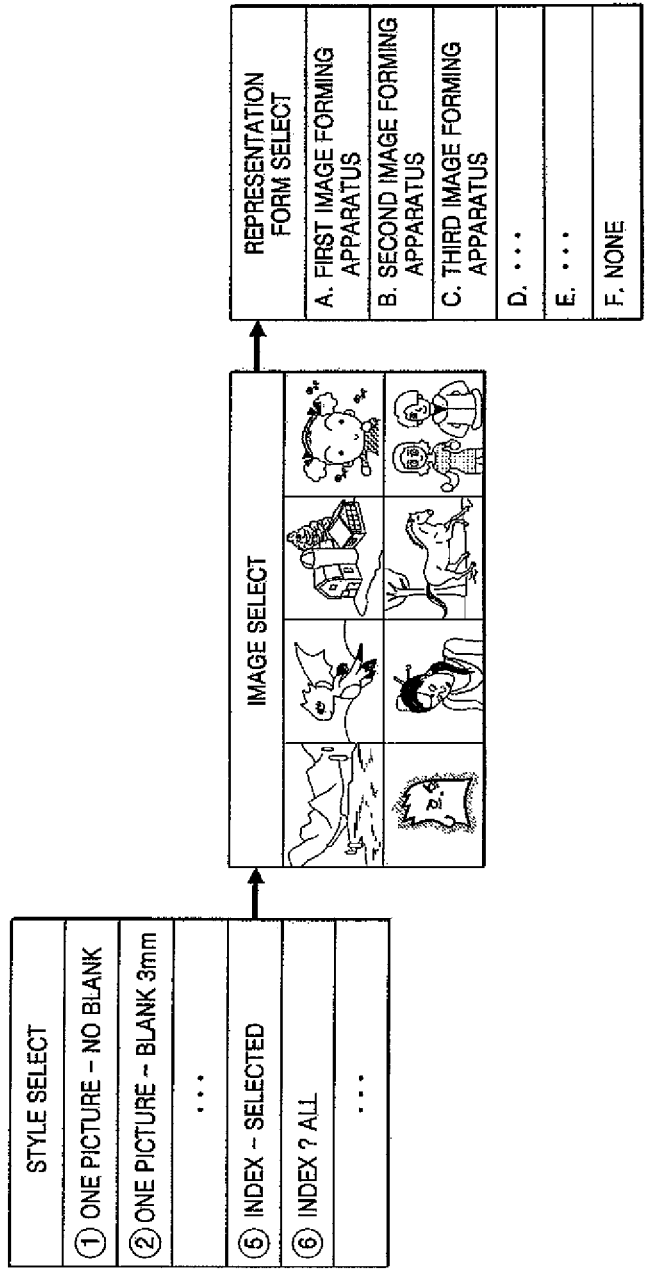

FIG. 10

```
<?xml version="1.0" encoding="UTF-8"?>
<!DOCTYPE html
    PUBLIC "-//W3C//DTD XHTML 1.0 Strict//EN"
    "DTD/xhtml1-strict.dtd">

<html xmlns="http://www.w3.org/1999/xhtml" xml:lang="en" lang="en">
<head>
<style type="text/css">
@media print {
@page {size:A4 portrait; margin:5mm; }
body {padding:0mm; }
table {font-size:12pt; text-align:center;}
caption {font-size:24pt; }
img {width:40mm; height:30mm; }
}
</style>
</head>
<body>
<table>
<caption>index print</caption>
<tr>
<td><img src="beach02.jpg" alt="image 1-1" /><br />November 17</td>
<td><img src="restaurant.jpg" alt="image 1-2"/><br />October 11</td>
<td><img src="beach01.jpg" alt="image 1-3" /><br />November 13</td>
<td><img src="swimming.jpg" alt="image 1-4" /><br />November 13</td>
</tr>
<tr>
<td><img src="restaurant.jpg" alt="image 2-1" /><br />October 11</td>
<td><img src="beach01.jpg" alt="image 2-2" /><br />December 11</td>
<td><img src="swimming.jpg" alt="image 2-3" /><br />November 13</td>
<td><img src="beach02.jpg" alt="image 2-4" /><br />November 13</td>
</tr>
</table>
</body>
</head>
```

FIG. 11

```
<?xml version="1.0" encoding="UTF-8"?>
<!DOCTYPE html
    PUBLIC "-//W3C//DTD XHTML 1.0 Strict//EN"
    "DTD/xhtml1-strict.dtd">

<html xmlns="http://www.w3.org/1999/xhtml" xml:lang="en" lang="en">
<head>
<style type="text/css">
@media print {
@page {size:A4 portrait; margin-top:5mm; margin-left:5mm;
    margin-right:16.5mm; margin-bottom:5mm; }
body {padding:0mm;}
h1{width:180mm; margin-top:0; font:bold 16pt serif; text-align:center; color:#black;}
p {height:47.5mm; color:black; margin:0; padding:1mm;
    width:40mm; text-align:center; font:11.5pt serif;}
p.col1 {margin-top:2.5mm; margin-left:0mm;}
p.col2 {margin-top:-47.5mm; margin-left:45mm;}
p.col3 {margin-top:-47.5mm; margin-left:90mm;}
p.col4 {margin-top:-47.5mm; margin-left:135mm;}
img {width:40mm; height:30mm}
}
</style>
</head>
<body>
<h1>index print</h1>
<p class="col1"><img src="beach02.jpg" alt="image 1-1"
    title="May 7" /><br />November 17</p>
<p class="col2"><img src="restaurant.jpg" alt="image 1-2"
    title="October 11" /><br />October 11</p>
<p class="col3"><img src="beach01.jpg" alt="image 1-3"
    title="November 13" /><br />November 13</p>
<p class="col4"><img src="swimming.jpg" alt="image 1-4"
    title="November 13" /><br />November 13</p>
<p class="col1"><img src="restaurant.jpg" alt="image 2-1"
    title="May 14" /><br />October 11</p>
<p class="col2"><img src="beach01.jpg" alt="image 2-2"
    title="December 11" /><br />December 11</p>
<p class="col3"><img src="swimming.jpg" alt="image 2-3"
    title="November 13" /><br />November 13</p>
<p class="col4"><img src="beach02.jpg" alt="image 2-4"
    title="November 13" /><br />November 13</p>
</body>
</head>
```

IMAGE FORMING METHOD AND SYSTEM USING XHTML-PRINT DATA

CROSS-REFERENCE TO RELATED APPLICATIONS

This application is a divisional application of U.S. patent application Ser. No. 11/371,050 filed Mar. 9, 2006 in the U.S. Patent and Trademark Office, now U.S. Pat. No. 8,194,269, which claims the benefit of Korean Patent Application No. 2005-29951, filed on Apr. 11, 2005, in the Korean Intellectual Property Office, and the benefit of Korean Patent Application No. 2005-50139, filed on Jun. 11, 2005, in the Korean Intellectual Property Office, the disclosures of which are incorporated herein in their entirety by reference.

BACKGROUND OF THE INVENTION

1. Field of the Invention

The present general inventive concept relates to image formation, and more particularly, to an image forming method and system using XHTML (extensible hypertext markup language)-print data, in which a device, such as a wireless communication apparatus or an electronic apparatus, generates XHTML-Print data and transmits the XHTML-Print data to an image forming apparatus that forms an image using the XHTML-Print data, the XHTML print which is a next generation page description language (PDL) described in universal plug and play (UPnP), mobile and image printing consortium (MIPC), and digital living network alliance (DLNA).

2. Description of the Related Art

In a conventional image forming method, a computer converts print data into a page description language (PDL) code using a printer driver and transmits the converted print data to a printer, i.e., an image forming apparatus, which forms an image corresponding to the print data.

The printer receives the print data through an input/output interface, and the print data is converted into a printing job language (PJL) command through a PJL parser. A type of emulation to be performed is determined through the analyzed PJL command, the emulation is then performed, and the emulated print data is output by a printing engine. In existing output methods, when an electronic apparatus such as a digital television or a mobile device such as a personal digital assistant (PDA) outputs the print data to the printer, the following problems occur.

First, printer drivers must be developed for various kinds of devices. That is, since existing devices use different operating systems without much regard for a printing function, there is a difficulty in using the printing function.

Second, in any kind of mobile device, the printer driver must be included in an application program.

Third, existing electronic apparatuses or mobile devices have problems in system resources and CPU power when accessing data over a network, executing an application, and driving the printer driver.

In another image forming method, the printer may directly receive the print data from an external device and print the print data. That is, the printer requests a print data provider to provide the print data and receives and prints the requested print data. However, this image forming method is very complex and has longer processing time for the output, compared with the previous method.

XHTML-Print data refers to a next generation page description language (PDL) described in universal plug and play (UPnP), mobile and image printing consortium (MIPC), and digital living network alliance (DLNA).

Conventionally, an XHTML-Print data generator generates single XHTML-Print data for a single representation form. However, since a display form of the XHTML-Print data has not been unified yet, a displayed image of the XHTML-Print data varies depending on a type of peripheral used to view the XHTML-Print data.

That is, for the XHTML-Print data generated in a specific XHTML-Print data generator, a type of a tag used for supporting the XHTML-Print data varies depending on type of image forming apparatus. Furthermore, although the same tag is used, the analysis thereof may vary. Accordingly, a user may not obtain a desired output. In an effort to solve this problem, guidelines for the output form of the XHTML-Print data have been published by various organizations, but have not been not yet been unified.

SUMMARY OF THE INVENTION

The present general inventive concept provides an image forming method and system using XHTML-Print data, in which a wireless communication apparatus or an electronic apparatus generates the XHTML-Print data and an image forming apparatus forms an image using the XHTML-Print data.

The present general inventive concept also provides an image forming method and system using XHTML-Print data, which can generate various representation forms of the XHTML-print data to output an image through various image forming apparatuses that correspond to various representation forms.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image forming method using XHTML-Print data, the method including receiving registration information about an image forming apparatus from the image forming apparatus, generating XHTML-print data from print data using the registration information of the image forming apparatus, transmitting the XHTML-Print data to the image forming apparatus, and printing the XHTML-Print data.

The foregoing and/or other aspects of the present general inventive concept may also be achieved by providing a method of forming an image, the method comprising receiving a print command associated with print data and a specific image forming apparatus selected from among a plurality of image forming apparatuses, determining an appropriate XHTML representation form for the specific image forming apparatus from among a plurality of XHTML representation forms, and converting the print data to XHTML-Print data having the appropriate representation form, and transmitting the XHTML-Print data to the specific image forming apparatus.

The foregoing and/or other aspects of the present general inventive concept may also be achieved by providing a wireless device usable in an image forming system, the device comprising an interface unit to receive a print command associated with print data and a specific image forming apparatus selected from among a plurality of image forming apparatuses, an XHTML-Print data generating unit to determine an appropriate XHTML representation form for the specific image forming apparatus from among a plurality of XHTML representation forms and to convert the print data to XHTML- Print data having the appropriate representation form, and a data transmitting unit to transmit the XHTML-Print data to the specific image forming apparatus.

The foregoing and/or other aspects of the present general inventive concept may also be achieved by providing a wireless device usable in an image forming system, the device comprising a capability manager to obtain registration information about a first image forming apparatus and a second image forming apparatus, a contents loader to receive a first print data and a second print data stored at one or more locations in a network, an XHTML generator to generate first XHTML-Print data from the first print data in a first predetermined representation form according to the registration information of the first image forming apparatus and to generate second XHTML-Print data from the second print data in a second predetermined representation form according to the registration information of the second image forming apparatus, and an interface to provide the first and second XHTML-Print data to the first and second image forming apparatuses, respectively.

The foregoing and/or other aspects of the present general inventive concept may also be achieved by providing an image forming system using XHTML-Print data, the system including an image forming apparatus including a registration information transmitting unit which transmits registration information about the image forming apparatus and a printing unit which prints XHTML-Print data, and a device in communication with the image forming apparatus, the device including a registration information collecting unit which collects the registration information about the image forming apparatus, an XHTML-Print data generating unit which generates the XHTML-Print data from corresponding print data using the registration information about the image forming apparatus, and a data transmitting unit which transmits the XHTML-Print data to the image forming apparatus.

The foregoing and/or other aspects of the present general inventive concept may also be achieved by providing an image forming method using XHTML-Print data in an image forming system including a device and a plurality of image forming apparatuses in communication with the device, the method including displaying on the device a list of the image forming apparatuses corresponding to various representation forms of the XHTML-Print data as representation form selecting information, generating the XHTML-Print data of a specific representation form selected from the representation form selecting information, and transmitting the generated XHTML-Print data to an image forming apparatus corresponding to the specific representation form and forming an image accordingly.

The foregoing and/or other aspects of the present general inventive concept may also be achieved by providing an image forming system using XHTML-Print data, which includes a device and a plurality of image forming apparatuses in communication with the device, the device including a user interface unit which displays a list of the image forming apparatuses corresponding to various representation forms of the XHTML-Print data as representation form selecting information, an XHTML-Print data generating unit which generates the XHTML-Print data of a specific representation form selected from the representation form selecting information, and a data transmitting unit which transmits the generated XHTML-Print data to an image forming apparatus corresponding to the specific representation form.

The foregoing and/or other aspects of the present general inventive concept may also be achieved by providing an image forming apparatus network, comprising a plurality of image forming apparatuses each associated with registration information about the respective image forming apparatuses, and at least one wireless device to receive a print command associated with a selected image forming apparatus, to obtain registration information about the selected image forming apparatus, to convert print data to a selected XHTML representation form determined according to the registration information about the selected image forming apparatus, and to transmit the converted print data in the selected XHTML representation form to the selected image forming apparatus for printing.

The foregoing and/or other aspects of the present general inventive concept may also be achieved by providing an image forming apparatus network, comprising a plurality of image forming apparatuses each associated with a specific XHTML representation form, and at least one wireless device to receive a print command associated with a selected image forming apparatus, to convert print data to the specific XHTML representation form associated with the selected image forming apparatus, and to transmit the converted print data to the selected image forming apparatus.

The foregoing and/or other aspects of the present general inventive concept may also be achieved by providing an image forming apparatus, comprising a first unit to generate information on the image forming apparatus, a second unit to receive XHTML data corresponding to the information, and a third unit to form an image according to the XHTML data.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 9 illustrates an example of representation form selecting information displayed on a device in the method of FIG. 8;

FIG. 10 illustrates an example of XHTML-Print data to print images illustrated in FIG. 9 in accordance with a specific representation form;

FIG. 11 illustrates an example of XHTML-Print data to print the images illustrated in FIG. 9 in accordance with another specific representation form.

DETAILED DESCRIPTION OF THE PREFERRED EMBODIMENTS

Figure 1:
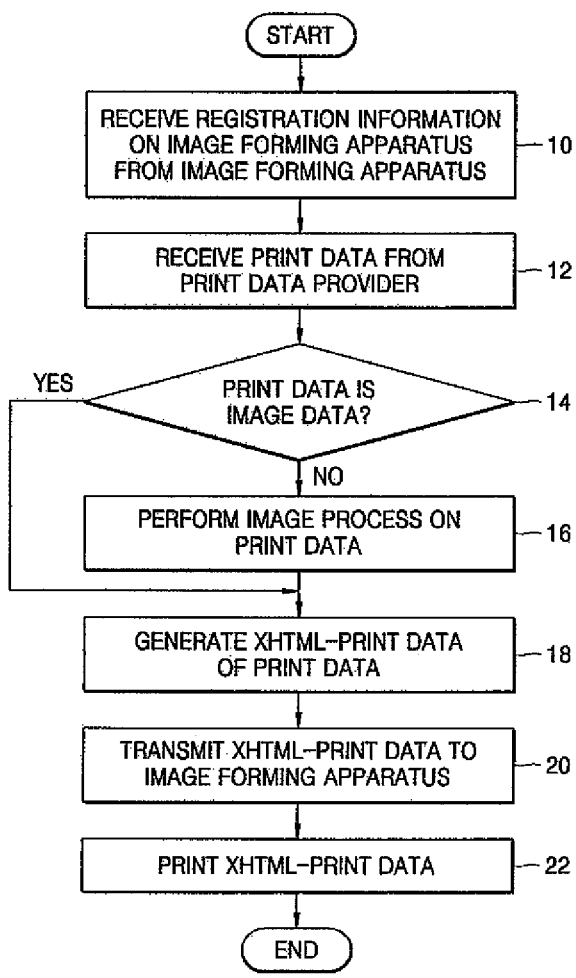
FIG. 1 is a flowchart illustrating an image forming method using XHTML-Print data according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. Hereinafter, an image forming method using XHTML-print data according to an embodiment of the present invention will be described in detail with reference to the accompanying drawings.

FIG. 1 is a flowchart illustrating an image forming method using XHTML-Print data according to an embodiment of the present general inventive concept. The below-described operations and processes of FIG. 1 may be performed by a device such as a mobile phone, a personal digital assistant (PDA), and an image forming apparatus. Extensible hypertext markup language (XHTML) is made by formulating hypertext markup language (HTML) 4, which is an application of extensible markup language (XML). The XHTML-Print data is designed to represent image forming data which is provided from a mobile device to the image forming apparatus.

First, registration information about the image forming apparatus is received from the image forming apparatus (operation 10). The registration information about the image forming apparatus includes print sheet size information, font information, monochrome/color information, and blank set information.

The operation 10 is performed after a print request. That is, the registration information about the image forming apparatus is received after a user requests a print job.

Alternatively, the operation 10 may be performed before the print job is requested. That is, the registration information about the image forming apparatus may be received when a power supply voltage is applied to the device, or when the device is initialized.

The registration information about the image forming apparatus is received from the image forming apparatus through a wire/wireless network. The device and the image forming apparatus are connected to each other through the wire/wireless network such as the Internet, and the registration information about the image forming apparatus is received from the image forming apparatus through the wire/wireless network.

Figure 2:
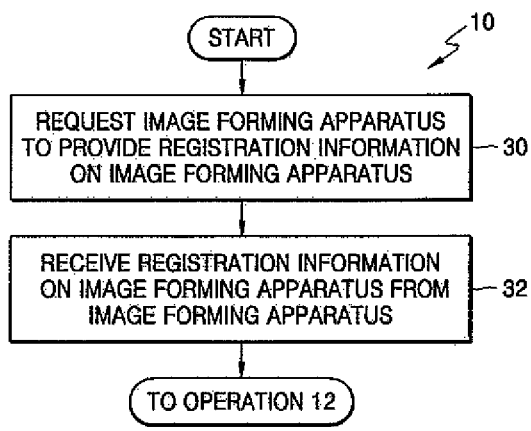
FIG. 2 is a flowchart illustrating an operation 10 of the image forming method of FIG. 1.

FIG. 2 is a flowchart illustrating the operation 10 of FIG. 1.

First, the image forming apparatus is requested to provide the registration information (operation 30). That is, the device requests the image forming apparatus to provide the registration information as information about the image forming apparatus.

After the operation 30, the registration information is received from the image forming apparatus (operation 32). Here, the registration information is received from the image forming apparatus through the wire/wireless network such as the Internet.

After the operation 10, print data is received by the device from a print data provider through the wire/wireless network (operation 12).

If the print data is previously included (i.e., stored) in the device, the operation 12 may be omitted and operation 14 is performed.

Figure 3:
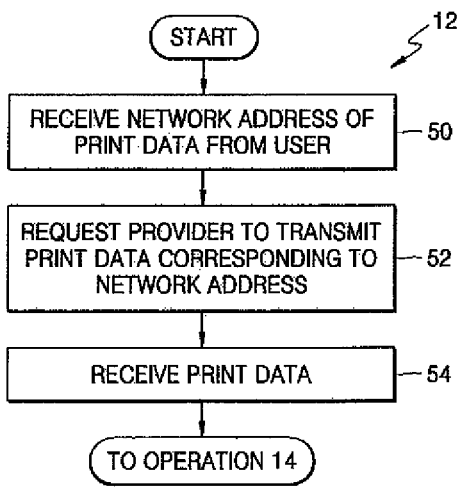
FIG. 3 is a flowchart illustrating an operation 12 of the image forming method of FIG. 1.

FIG. 3 is a flowchart illustrating the operation 12 of FIG. 1.

A network address of the print data is received by the device from the user (operation 50). The network address of the print data indicates a standardized logical address for representing various resources such as a file or a news group on the Internet, such as a uniform resource locator (URL).

After the operation 50, the print data provider is requested to provide the print data located at the network address by the device (operation 52).

After the operation 52, the requested print data is received by the device from the print data provider (operation 54). The print data is received from the print data provider through the wire/wireless network.

The received print data includes at least one of hypertext markup language (HTML) data, extensible hypertext markup language (XHTML) data, extensible markup language (XML) data, joint photographic experts group (JPEG) data, graphics interchange format (GIF) data, bit map (BMP) data, portable network graphics (PNG) data, binary data, and readable text.

The hypertext markup language (HTML) data, the extensible hypertext markup language (XHTML) data, and the extensible markup language (XML) data are data that corresponds to web content. Furthermore, the joint photographic experts group (JPEG) data, the graphics interchange format (GIF) data, the bit map (BMP) data, and the portable network graphics (PNG) data are image data.

After the operation 12, it is determined whether the print data received by the device is the image data (the operation 14), such as the joint photographic experts group (JPEG) data, the graphics interchange format (GIF) data, the bit map (BMP) data, and the portable network graphics (PNG) data.

If the print data is the image data, operation 18 is performed. In operation 16, the print data is image-processed. The print data which is already image-processed need not be image-processed in the operation 16.

However, if the print data received by the device is not the image data, after the operation 14, the print data is image-processed (the operation 16). The image processing of the print data is similar to the function of a browser (for example, Internet Explorer or Netscape). That is, the image processing of the print data indicates performing analysis, layout, and drawing processes of the print data that corresponds to the web content, such as the hypertext markup language (HTML) data, the extensible hypertext markup language (XHTML) data, and the extensible markup language (XML) data. Here, the image processing performs only the analysis, layout, and drawing processes of the print data, but does not display the result, while a general function of the browser typically displays the contents.

After the operation 16, the XHTML-Print data is generated from the print data received by the device using the registration information about the image forming apparatus (operation 18).

The print data is converted into the XHTML-Print data using, for example, the print sheet size information, the font information, the monochrome/color information, and the blank set information, which are the registration information about the image forming apparatus.

After the operation 18, the generated XHTML-Print data is transmitted to the image forming apparatus (operation 20).

Particularly, the generated XHTML-Print data is divided by a chunk unit and the divided XHTML-Print data is transmitted to the image forming apparatus in the operation 20. By dividing the XHTML-Print data by the chunk unit, the device can transmit the data to the image forming apparatus without using a process of exchanging a message for receiving the data with the image forming apparatus. The chunk indicates binding the information in a unified representation.

After the operation 20, the XHTML-Print data transmitted to the image forming apparatus is printed (operation 22). The XHTML-Print data is subjected to interpreting processes such as the analysis, layout, and drawing processes by a method similar to the method of processing PDL, and the interpreted XHTML-Print data is printed.

Figure 4A:
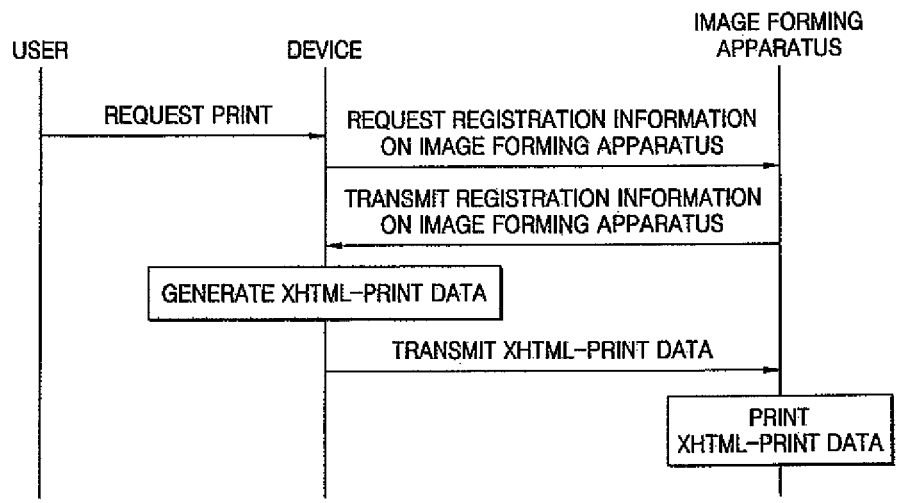
FIG. 4A illustrates an example of a process of generating the XHTML-Print data from print data included in a device and printing the XHTML-print data according to an embodiment of the present general inventive concept.

FIG. 4A illustrates an example of a process of generating the XHTML-Print data from the print data included (i.e., stored) in the device and printing the XHTML-Print data. Particularly, FIG. 4A illustrates a case in which the registration information about the image forming apparatus is provided when the user requests the print job. When the user requests the print job, the device requests the image forming apparatus to provide the corresponding registration information. The image forming apparatus provides the device with the requested registration information and the device receives the provided registration information. Thereafter, the device generates the XHTML-Print data from the print data which is previously included (i.e., previously stored), using the registration information about the image forming apparatus. The generated XHTML-Print data is transmitted to the image forming apparatus through the wire/wireless network. Then, the image forming apparatus prints the XHTML-Print data.

Figure 4B:
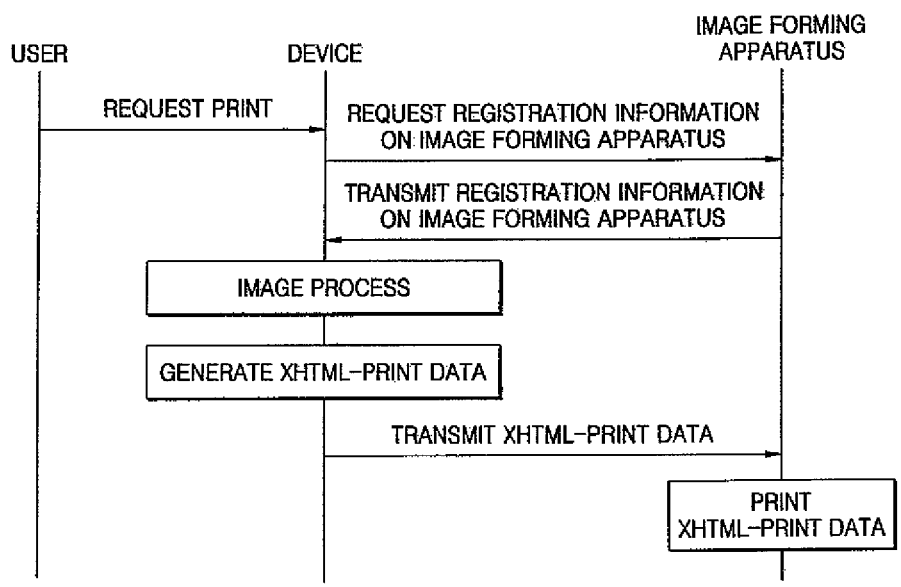
FIG. 4B illustrates another example of a process of generating the XHTML-Print data from print data included in a device and printing the XHTML-Print data according to another embodiment of the present general inventive concept.

FIG. 4B illustrates another example of a process of generating the XHTML-Print data from the print data included (i.e., stored) in the device and printing the XHTML-Print data. Particularly, FIG. 4B illustrates a case in which the process of image-processing the print data is additionally included. When the user requests the print job, the device requests the image forming apparatus to provide the corresponding registration information. The image forming apparatus provides the device with the requested registration information and the device receives the provided registration information. The device determines whether the print data, which is previously included, is the image data. If the print data is not image data, the device performs the image processing on the print data. Thereafter, the device generates the XHTML-Print data from the image-processed print data using the registration information about the image forming apparatus. The generated XHTML-Print data is transmitted to the image forming apparatus through the wire/wireless network. Then, the image forming apparatus prints the XHTML-Print data.

Figure 5A:
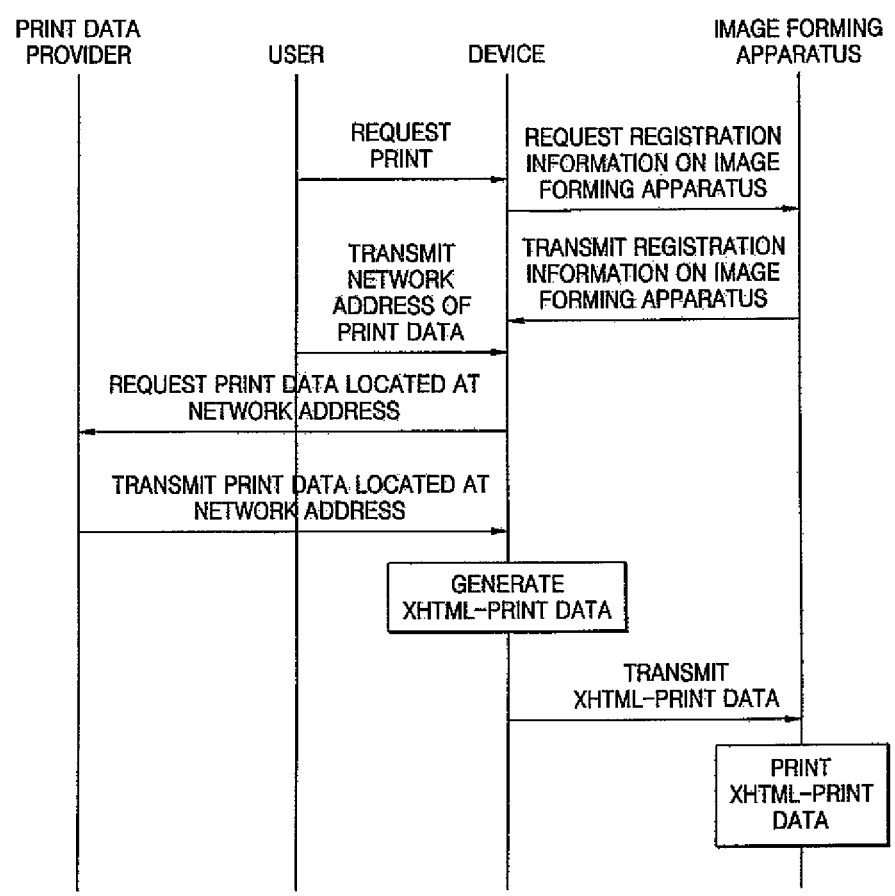
FIG. 5A illustrates an example of a process of generating the XHTML-Print data from print data provided by a print data provider and printing the XHTML-Print data according to another embodiment of the present general inventive concept.

FIG. 5A illustrates an example of a process of generating the XHTML-Print data from the print data provided by the print data provider and printing the XHTML-Print data. Particularly, FIG. 5A illustrates a case in which the registration information about the image forming apparatus is provided when the user requests the print job. When the user requests the print job, the device requests the image forming apparatus to provide the corresponding registration information. The image forming apparatus provides the device with the requested registration information, and the device receives the provided registration information about the image forming apparatus. When the user provides the network address of the print data, the device requests the print data provider to transmit the print data located at the network address. The print data provider then transmits the requested print data to the device. The device generates the XHTML-print data from the print data which is provided by the print data provider using the registration information about the image forming apparatus. The generated XHTML-Print data is transmitted to the image forming apparatus through the wire/wireless network. Then, the image forming apparatus prints the XHTML-Print data.

Figure 5B:
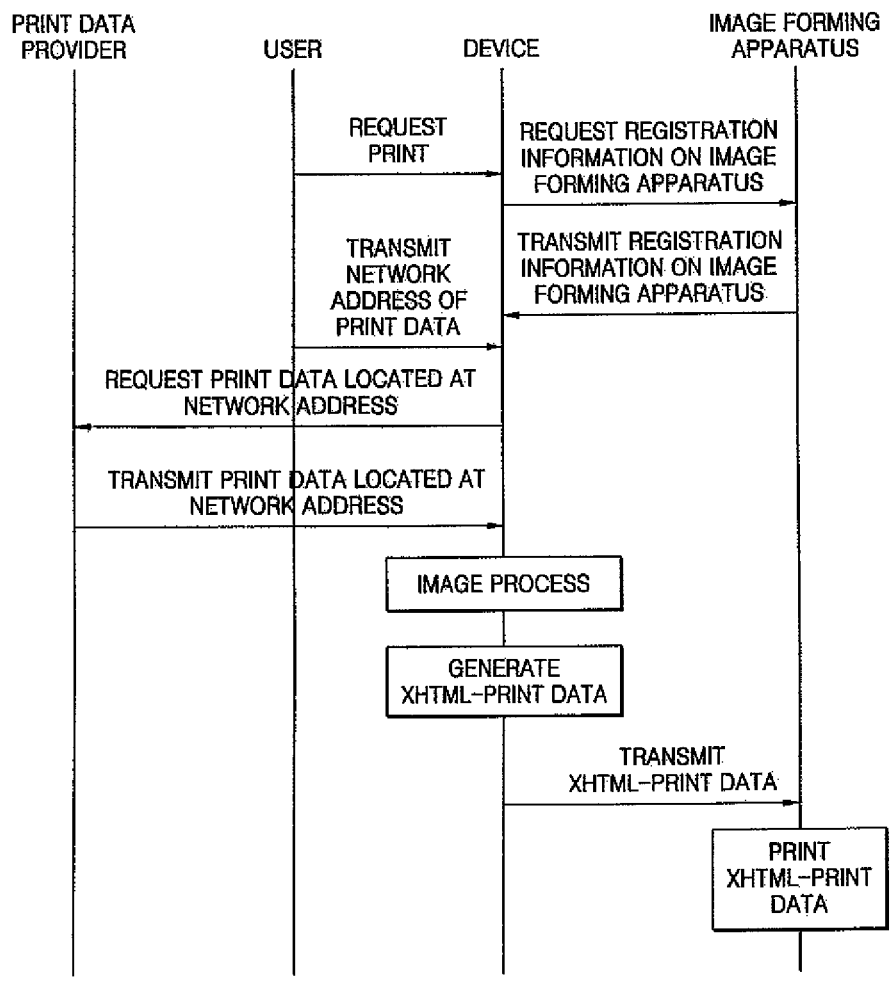
FIG. 5B illustrates another example of a process of generating the XHTML-Print data from print data provided by a print data provider and printing the XHTML-Print data according to another embodiment of the present general inventive concept.

FIG. 5B illustrates another example of a process of generating the XHTML-Print data from the print data provided by the print data provider and printing the XHTML-Print data. Particularly, FIG. 5B illustrates a case in which the process of image-processing the print data is additionally included. When the user requests the print job, the device requests the image forming apparatus to provide the corresponding registration information. The image forming apparatus then provides the device with the requested registration information and the device receives the provided registration information. When the user provides the network address of the print data, the device requests the print data provider to transmit the print data located at the network address. The print data provider then transmits the requested print data to the device. The device determines whether the print data received from the print data provider is the image data. If the print data is not image data, the device performs the image processing on the print data. Thereafter, the device generates the XHTML-Print data from the print data which is provided by the print data provider using the registration information about the image forming apparatus. The generated XHTML-Print data is transmitted to the image forming apparatus through the wire/wireless network. Then, the image forming apparatus prints the XHTML-Print data.

The general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present general inventive concept can be easily construed by programmers skilled in the art to which the present general inventive concept pertains.

Hereinafter, an image forming system using XHTML-Print data according to an embodiment of the present general inventive concept will be described with reference to the accompanying drawings.

Figure 6:
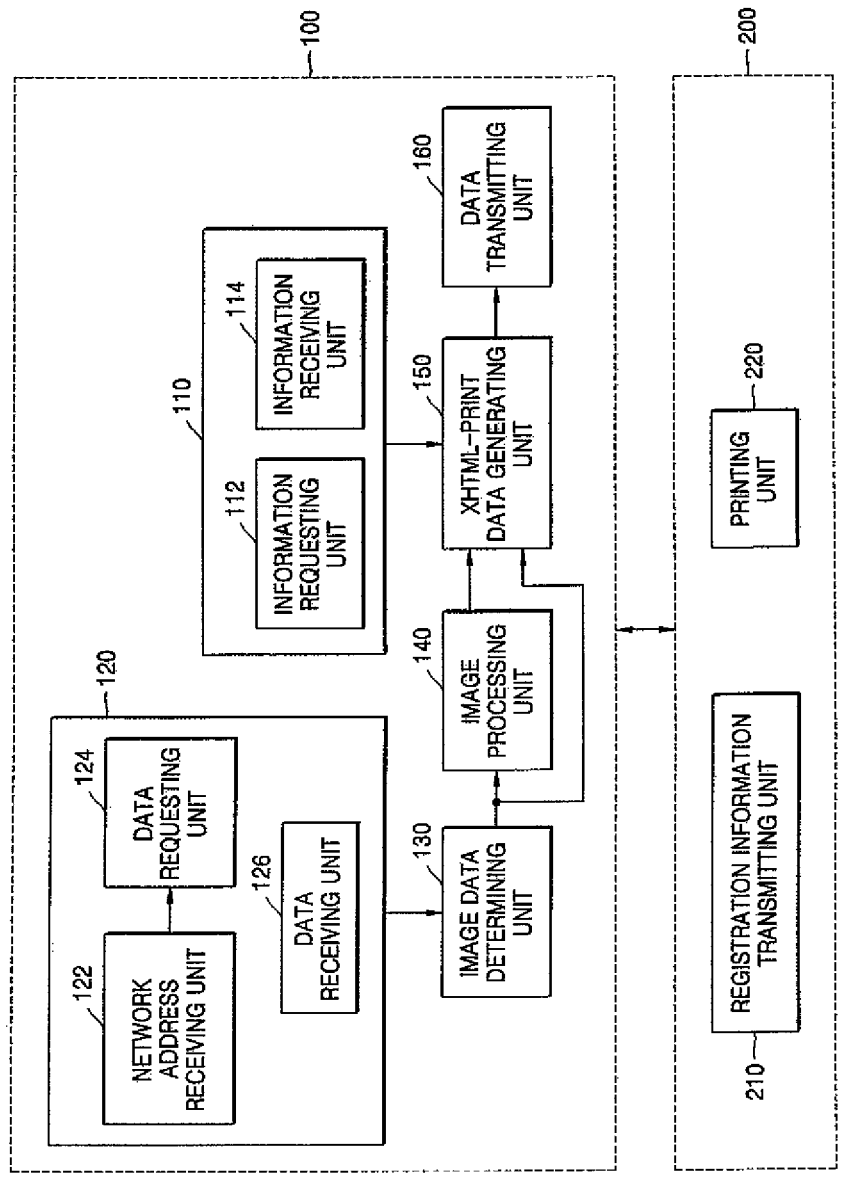
FIG. 6 is a block diagram illustrating an image forming system using XHTML-Print data according to an embodiment of the present general inventive concept.

FIG. 6 is a block diagram illustrating an image forming system using XHTML-Print data according to an embodiment of the present general inventive concept. The image forming system includes a device 100 and an image forming apparatus 200. Here, the device 100 may be a wireless communication apparatus such as a mobile phone or a personal digital assistant (PDA).

The device 100 includes a registration information collecting unit 110, a print data collecting unit 120, an image data determining unit 130, an image processing unit 140, an XHTML-Print data generating unit 150, and a data transmitting unit 160.

The registration information collecting unit 110 collects registration information from the image forming apparatus 200 and outputs the result to the XHTML-Print data generating unit 150. The registration information collecting unit 110 may collect registration information from a variety of image forming apparatuses.

The registration information collecting unit 110 collects the registration information when a print job is requested. Alternatively, the registration information collecting unit 110 may collect the registration information before the print job is requested, that is, when a power supply voltage is applied to the device, or when the device is initialized.

The registration information collecting unit 110 receives the registration information from the image forming apparatus 200 through a wire/wireless network.

The registration information collecting unit 110 collects at least one of print sheet size information, font information, monochrome/color information, and blank set information as the registration information about the image forming apparatus 200.

The registration information collecting unit 110 includes an information requesting unit 112 and an information receiving unit 114.

The information requesting unit 112 requests the image forming apparatus 200 to provide the registration information, such as the print sheet size information, the font information, the monochrome/color information, and the blank set information.

The information receiving unit 114 receives and stores the registration information received from the image forming apparatus 200 through the wire/wireless network. The registration information about the image forming apparatus 200 is stored in the information receiving unit 114 and is output to the XHTML-Print data generating unit 150. The information receiving unit 114 may store registration information about a plurality of image forming apparatuses.

The print data collecting unit 120 receives and stores the print data provided from a print data provider through the wire/wireless network and outputs the stored print data to the image data determining unit 130.

The print data collecting unit 120 receives from the print data provider at least one of hypertext markup language (HTML) data, extensible hypertext markup language (XHTML) data, extensible markup language (XML) data, joint photographic experts group (JPEG) data, graphics interchange format (GIF) data, bit map (BMP) data, portable network graphics (PNG) data, binary data, and readable text as the print data.

The print data collecting unit 120 includes a network address receiving unit 122, a data requesting unit 124, and a data receiving unit 126.

The network address receiving unit 122 receives a network address of the print data from a user and outputs the provided network address to the data requesting unit 124.

The data requesting unit 124 requests the print data provider to transmit the print data located at the received network address.

The data receiving unit 126 receives the requested print data from the print data provider and outputs the received print data to the image data determining unit 130.

The image data determining unit 130 determines whether the print data received from the print data provider is image data and outputs the determined result to the image processing unit 140 and the XHTML-Print data generating unit 150.

For example, if the print data is data that corresponds to web content, such as the hypertext markup language (HTML) data, the extensible hypertext markup language (XHTML) data, and the extensible markup language (XML) data, the image data determining unit 120 outputs the determined result to the image processing unit 140.

However, if the print data is the image data, such as the joint photographic experts group (JPEG) data, the graphics interchange format (GIF) data, the bit map (BMP) data, and the portable network graphics (PNG) data, the image data determining unit 130 outputs the determined result to the XHTML-Print data generating unit 150.

The image processing unit 140 performs the image processing on the print data and outputs the image-processed print data to the XHTML-Print data generating unit 150. For example, the image processing unit 140 may perform analysis, layout, and drawing processes on the print data that corresponds to the web content.

The XHTML-Print data generating unit 150 generates the XHTML-Print data from the print data using the registration information about the image forming apparatus 200 and outputs the generated XHTML-Print data to the data transmitting unit 160.

The XHTML-Print data generating unit 150 converts the print data into the XHTML-Print data using, for example, the print sheet size information, the font information, the monochrome/color information, and the blank set information, which may be included in the registration information about the image forming apparatus 200.

The data transmitting unit 160 transmits the generated XHTML-Print data to the image forming apparatus 200.

The data transmitting unit 160 divides the generated XHTML-Print data by a chunk unit and transmits the divided XHTML-Print data to the image forming apparatus 200. Since the data transmitting unit 160 divides the XHTML-Print data by the chunk unit, the device 100 can transmit the data to the image forming apparatus 200 without using a process of exchanging a message for receiving the data with the image forming apparatus 200.

The image forming apparatus 200 includes a registration information transmitting unit 210 and a printing unit 220.

The registration information transmitting unit 210 transmits the registration information about the image forming apparatus 200 to the device 100. The registration information transmitting unit 210 transmits the registration information about the image forming apparatus 200, such as the print sheet size information, the font information, the monochrome/color information, and the blank set information of the image forming apparatus 200, to the registration information collecting unit 110 of the device 100 through the wire/wireless network.

The printing unit 220 performs the analysis, layout, and drawing processes on the XHTML-Print data received from the device 100 through the wire/wireless network and prints the XHTML-Print data. The printing unit 220 may include a parsing unit (not shown) to analyze the XHTML-Print data, a layout unit (not shown) to layout the analyzed XHTML-Print data, and a drawing unit (not shown) to draw the layout of the XHTML-Print data.

The printing unit 220 prints the XHTML-Print data on a print sheet or recording medium.

Figure 7:
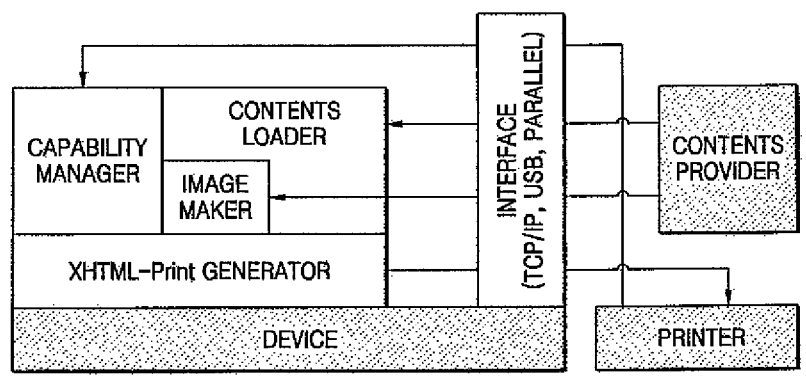
FIG. 7 is anther block diagram of the image forming system illustrated in FIG. 6.

FIG. 7 is another block diagram of the image forming system using the XHTML-Print data of in FIG. 6. The device illustrated in FIG. 7 (which corresponds to the device 100 of FIG. 6) includes a capability manager, a contents loader, an image maker, an XHTML-Print generator, and an interface. Here, the capability manager of FIG. 7 corresponds to the registration information collecting unit 110 of FIG. 6, the contents loader of FIG. 7 corresponds to the print data collecting unit 120 of FIG. 6, the image maker of FIG. 7 corresponds to the image processing unit 140 of FIG. 6, and the XHTML-Print generator of FIG. 7 corresponds to the XHTML-Print data generating unit 150 of FIG. 6. The printer may correspond to the image forming apparatus 200 of FIG. 6, and the contents provider may correspond to the print data provider not illustrated in FIG. 6.

Hereinafter, an image forming method using XHTML-Print data according to another embodiment of the present general inventive concept will be described in detail with reference to the accompanying drawings.

Figure 8:
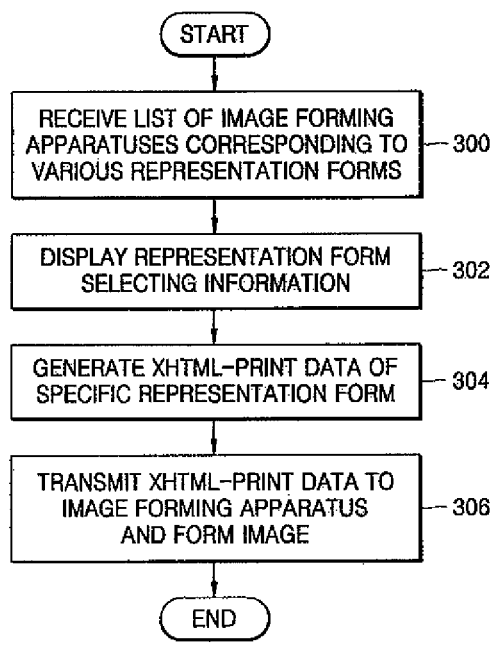
FIG. 8 is a flowchart illustrating an image forming method using XHTML-Print data according to another embodiment of the present general inventive concept.

FIG. 8 is a flowchart illustrating an image forming method using XHTML-Print data according to another embodiment of the present general inventive concept.

In order to realize the image forming method using the XHTML-Print data of FIG. 8, a device and an image forming apparatus are connected to each other through a network. The below-described processes and operations of the method of FIG. 8 are performed by a device such as a mobile phone or a personal digital assistant (PDA), and an image forming apparatus. Extensible hypertext markup language (XHTML) is made by formulating hypertext markup language (HTML) 4, which is an application of extensible markup language (XML). The XHTML-Print data is designed to represent image forming data which is provided from a mobile device to an image forming apparatus.

First, the device receives a list of a plurality of image forming apparatuses corresponding to representation form selecting information (operation 300). The representation form of the XHTML-Print data may vary and may include, for example, a "p-tag" form and a "table" form. The image forming apparatuses analyze various representation forms of the XHTML-Print data using an analysis algorithm, and form an image. The image forming apparatuses may output different results depending on the representation form of the XHTML-Print data. That is, an image forming apparatus $F_1$ may output the "p-tag" form of the XHTML-Print data as a good quality output which is desired by a user, an image forming apparatus $F_2$ may output the "p-tag" form of the XHTML-Print data as a result which is not desired by the user. This occurs, because each image forming apparatus is configured to suitably process only a specific representation form of the XHTML-Print data. Accordingly, in operation 300, it is determined which of the image forming apparatuses forms a good quality image with respect to any representation form of the XHTML-Print data to register the list of image forming apparatuses to correspond to the representation form.

Information about the representation forms and the list of the corresponding image forming apparatuses is referred to as "representation form selecting information."

FIG. 9 illustrates an example of the representation form selecting information displayed on the device in the image forming method of FIG. 8. As illustrated in FIG. 9, a first image forming apparatus is registered as an image forming apparatus that corresponds to a representation form A, a second image forming apparatus is registered as an image forming apparatus that corresponds to a representation form B, and a third image forming apparatus is registered as an image forming apparatus corresponds to a representation form C. The first image forming apparatus that corresponds to the representation form A can form a good quality image when receiving the representation form A of the XHTML-Print data, the second image forming apparatus that corresponds to the representation form B can form a good quality image when receiving the representation form B of the XHTML-Print data, and the third image forming apparatus that corresponds to the representation form C can form a good quality image when receiving the representation form C of the XHTML-Print data.

After the operation 300, when the print job is requested, the representation form selecting information is displayed (operation 302). As illustrated in FIG. 9, the representation form selecting information can allow the representation form of the XHTML-Print data to be selected depending on the image forming apparatus by checking which of the image forming apparatuses can form a good-quality image when receiving any representation form of the XHTML-Print data.

As illustrated in FIG. 9, the representation form selecting information is displayed on the device. In addition, an image selected by the user ("image select") and a list of image forming styles ("style select") are displayed.

After the operation 302, the XHTML-Print data of a specific representation form selected from the representation form selecting information is generated (operation 304). For example, if the output is desired to be obtained using the second image forming apparatus in the representation form selecting information of FIG. 9, the XHTML-Print data of the representation form B is generated such that the good quality output is obtained from the second image forming apparatus. When the user selects the representation form B from the representation form selecting information, the XHTML-Print data of the representation form B selected by the user is generated. When the user selects the representation information A from the representation form selecting information, the XHTML-Print data of the selected representation form A is generated. When the user selects the representation form C from the representation form selecting information, the XHTML-Print data of the selected representation form C is generated.

FIG. 10 illustrates an example of the XHTML-Print data to generate the images illustrated in FIG. 9 in accordance with a specific representation form. FIG. 10 illustrates the "table" form of the XHTML-Print data for the image to be output.

FIG. 11 illustrates an example of the XHTML-Print data to generate the images illustrated in FIG. 9 in accordance with another specific representation form. FIG. 11 illustrates the "p-tag" form of the XHTML-Print data for the image to be output.

As illustrated in FIG. 9, the user selects the images to be output and the image forming styles of the selected images. In addition, the user checks the image forming apparatus for outputting the image through the representation form selecting information and selects the representation form that corresponds to the image forming apparatus. Thereafter, as illustrated in FIGS. 10 and 11, the XHTML-Print data that corresponds to the representation form selected by the user is generated.

After the operation 304, the generated XHTML-Print data is transmitted to the image forming apparatus to form the image (operation 306). The XHTML-Print data of the specific representation form selected by the user is transmitted to the image forming apparatus, analyzed, and output in accordance with the analyzed result. Particularly, since the generated XHTML-Print data is transmitted to the image forming apparatus that corresponds to the specific representation form, the good quality output can be obtained through the image forming apparatus that corresponds to the specific representation form.

For example, when the user selects the representation form B from the representation form selecting information, the XHTML-Print data of the representation form B selected by the user is generated and transmitted to the second image forming apparatus that corresponds to the representation form B. The second image forming apparatus that corresponds to the representation form B analyzes the received XHTML-Print data and forms the good quality image.

The general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present general inventive concept can be easily construed by programmers skilled in the art to which the present general inventive concept pertains.

Hereinafter, an image forming system using XHTML-Print data according to another embodiment of the present general inventive concept will be described in detail with reference to the accompanying drawings.

Figure 12:
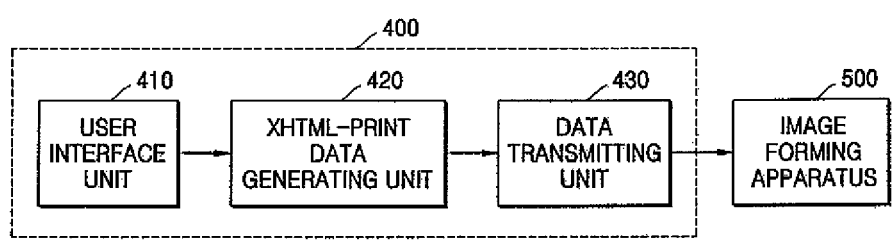
FIG. 12 is a block diagram illustrating an image forming system using XHTML-Print data according to another embodiment of the present general inventive concept.

FIG. 12 is a block diagram illustrating an image forming system using the XHTML-Print data according to another embodiment of the present general inventive concept. The image forming system includes a device 400 and an image forming apparatus 500 connected to the device 400 through a network.

The device 400 includes a user interface unit 410, an XHTML-Print data generating unit 420, and a data transmitting unit 430.

The user interface unit 410 receives a list of a plurality of image forming apparatuses that corresponds to representation form selecting information. The user interface unit 410 associates to the list of the image forming apparatuses to corresponding representation forms.

As illustrated in FIG. 9, the user interface unit 410 includes the representation form selecting information including a first image forming apparatus registered to correspond to a representation form A, a second image forming apparatus registered to correspond to a representation form B, and a third image forming apparatus registered to correspond to a representation form C.

Referring to FIG. 12, when the device 400 requests a print job, the user interface unit 410 displays the representation form selecting information. As illustrated in FIG. 9, the user interface unit 410 displays the representation form selecting information such that a user checks the image forming apparatus that corresponds to the representation form. An image selected by the user ("image select") and a list of image forming styles ("style select") may also be displayed.

The user interface unit 410 outputs information about the image selected by the user, the selected image forming style, and the selected representation form to the XHTML-print data generating unit 420.

The XHTML-Print data generating unit 420 generates the XHTML-Print data of a specific representation form selected from the representation form selecting information and outputs the generated XHTML-Print data to the data transmitting unit 430. When receiving the information about the selected image, the selected image forming style, and the selected representation form from the user interface unit 410, the XHTML-Print data generating unit 420 generates the XHTML-Print data in accordance with the selected image, the selected image forming style, and the selected representation form.

The XHTML-Print data generating unit 420 includes XHTML-Print data generating information which can generate various representation forms of the XHTML-Print data in order to generate the XHTML-Print data of the representation form selected by the user. For example, the XHTML-Print data generating unit 120 includes various representation forms of information such as a "p-tag" form and a "table" form.

The data transmitting unit 430 transmits the XHTML-Print data received from the XHTML-Print data generating unit 420 to the image forming apparatus 500. Particularly, the data transmitting unit 430 can transmit the generated XHTML-Print data to the image forming apparatus that corresponds to a specific representation form (i.e., the selected representation form of the image forming apparatus 500).

The image forming apparatus 500 receives the generated XHTML-Print data from the data transmitting unit 430, analyzes the received XHTML-Print data, and forms an image. Particularly, when the image forming apparatus 500, which receives the XHTML-Print data, is the image forming apparatus that corresponds to the specific representation form of the XHTML-Print data, the image forming apparatus can form a good quality image.

As described above, according to various embodiments an image forming method and a system using XHTML-Print data can print the XHTML-Print data, which is a next generation page description language (PDL) described in universal plug and play (UPnP), mobile and image printing consortium (MIPC), and digital living network alliance (DLNA), using existing image forming apparatuses in an interpreting manner such as PCL.

That is, according to various embodiments of an image forming method and a system using XHTML-Print data of the present general inventive concept, since the XHTML-Print data is subjected to analysis, layout, and drawing processes and then printed in an image forming apparatus, print complexity is reduced and a processing time required to request and respond to print data is shortened.

Moreover, according to various embodiments of an image forming method and a system using XHTML-Print data of the present general inventive concept, the XHTML-Print data can be conveniently transmitted from a mobile phone or a personal digital assistant (PDA) to an image forming apparatus.

In addition, according to various embodiments of an image forming method and a system using XHTML-Print data of the present general inventive concept, an image forming apparatus can perform a printing function, although a mobile phone or a personal digital assistant (PDA) does not include a plurality of image forming drivers.

Furthermore, according to various embodiments of an image forming method and a system using XHTML-Print data of the present general inventive concept, various representation forms of XHTML-Print data can be generated.

In addition, according to various embodiments of an image forming method and a system using XHTML-Print data of the present general inventive concept, a good quality output can be obtained through image forming apparatuses corresponding to various representation forms.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of forming an image, the method comprising:
receiving a print command associated with print data and a specific image forming apparatus selected from among a plurality of image forming apparatuses;
after receiving the print command, determining whether the print data is image data or web content, and if the print data is the web content, creating image data as the print data without displaying the created image data;
determining an appropriate XHTML representation form for the specific image forming apparatus from among a plurality of XHTML representation forms;
converting the print data to XHTML-Print data having the appropriate representation form; and
transmitting the XHTML-Print data to the specific image forming apparatus.

2. The method of claim 1, wherein the print command includes a network address where the print data is stored, and the method further comprises:
receiving the print data from a provider located at the network address.

3. The method of claim 1, wherein the processing of the print data comprises analyzing the print data, laying out the print data, and drawing the layout print data.

4. The method of claim 1, wherein the plurality of XHTML representation forms include a table form and a p-tag form.

5. The method of claim 1, wherein the determining of the appropriate XHTML representation form comprises displaying a representation form select to enable any of the plurality of image forming apparatuses to be selected along with the corresponding XHTML representation form.

6. An image forming method using XHTML-Print data in an image forming system including a device and a plurality of image forming apparatuses in communication with the device the method, comprising:
displaying on the device a list of the image forming apparatuses corresponding to various representation forms of the XHTML-Print data as representation form selecting information;
generating the XHTML-Print data of a specific representation form selected from the representation form selecting information;
determining whether the XHTML-Print data is image data or web content, and if the XHTML-Print data is the web content, creating image data as the XHTML-Print data without displaying the created XHTML-Print data; and
transmitting the generated XHTML-Print data to an image forming apparatus corresponding to the specific representation form and forming an image accordingly.

7. The image forming method of claim 6, further comprising:
receiving the list of the image forming apparatuses corresponding to the representation form selecting information.

8. A wireless device usable in an image forming system, the device comprising:
an interface device to receive a print command associated with print data and a specific image forming apparatus selected from among a plurality of image forming apparatuses;
an XHTML-Print data generating device to determine an appropriate XHTML representation form for the specific image forming apparatus from among a plurality of XHTML representation forms and to convert the print data to XHTML-Print data having the appropriate representation form; and
a data transmitting device to transmit the XHTML-Print data to the specific image forming apparatus,
wherein at least one of the interface device and the XHTML-Print data generating device is implemented as processor, and
wherein the XHTML-Print data generating device determines whether the print data is image data or web content, and if the print data is the web content, creates image data as the print data without displaying the created image data.

9. The wireless device of claim 8, wherein the XHTML-Print data generating device determines registration information for the specific image forming apparatus and converts the print data to the XHTML-Print data having the appropriate representation form according to the determined registration information.

10. A wireless device usable in an image forming system, the device comprising:
a capability manager device to obtain registration information about a first image forming apparatus and a second image forming apparatus;
a contents loader device to receive a first print data and a second print data stored at one or more locations in a network;
an XHTML generator device to generate first XHTML-Print data from the first print data in a first predetermined representation form according to the registration information of the first image forming apparatus and to generate second XHTML-Print data from the second print data in a second predetermined representation form according to the registration information of the second image forming apparatus; and
an interface device to provide the first and second XHTML-Print data to the first and second image forming apparatuses, respectively,
wherein at least one of the capability manager device, the contents loader device and the XHTML generator device is implemented as processor,
wherein the XHTML-Print data generating device determines whether the first print data and the second print data are image data or web content, and if either the first print data or the second print data is the web content, creates image data as the corresponding first print data or the second print data without displaying the created image data.

11. A non-transitory computer-readable medium containing executable code, that when executed by a computer, performs an image forming method using XHTML-Print data in an image forming system including a device and a plurality of image forming apparatuses in communication with the device, the method comprising:
displaying on the device a list of the image forming apparatuses corresponding to various representation forms of the XHTML-Print data as representation form selecting information;
generating the XHTML-Print data of a specific representation form selected from the representation form selecting information;
determining whether the XHTML-Print data is image data or web content, and if the XHTML-Print data is the web content, creating image data as the XHTML-Print data without displaying the created XHTML-Print data; and
transmitting the generated XHTML-Print data to an image forming apparatus corresponding to the specific representation form and forming an image accordingly.

12. An image forming apparatus network, comprising:
a plurality of image forming apparatuses each associated with registration information about the respective image forming apparatuses; and
at least one wireless device to receive a print command associated with a selected image forming apparatus, to obtain registration information about the selected image forming apparatus, to convert print data to a selected XHTML representation form determined according to the registration information about the selected image forming apparatus, and to transmit the converted print data in the selected XHTML representation form to the selected image forming apparatus for printing,
wherein the at least one wireless device determines whether the print data is image data or web content, and if the print data is the web content, creates image data as the print data without displaying the created image data.

13. An image forming apparatus network, comprising:
a plurality of image forming apparatuses each associated with a specific XHTML representation form; and
at least one wireless device to receive a print command associated with a selected image forming apparatus, to convert print data to the specific XHTML representation form associated with the selected image forming apparatus, and to transmit the converted print data to the selected image forming apparatus,
wherein the at least one wireless device determines whether the print data is image data or web content, and if the print data is the web content, creates image data as the print data without displaying the created image data.

14. The network of claim 13, wherein the at least one wireless device includes representation form selecting information indicating the associations between each of the plurality of image forming apparatuses and the specific XHTML representation form, respectively.

15. An image forming apparatus, comprising:
a first device to generate information on the image forming apparatus;
a second device to receive XHTML data corresponding to the information, and determines whether the XHTML data is image data or web content, and if the XHTML data is the web content, creates image data as the XHTML data without displaying the created XHTML data; and
a third device to form an image according to the XHTML data,
wherein at least one of the first device, the second device and the third device is implemented as a processor.

* * * * *